Oct. 21, 1969   M. G. ARNOLD   3,474,324
VOLTAGE REGULATOR ACTUATED BY PERIODIC PULSES
Filed March 30, 1967
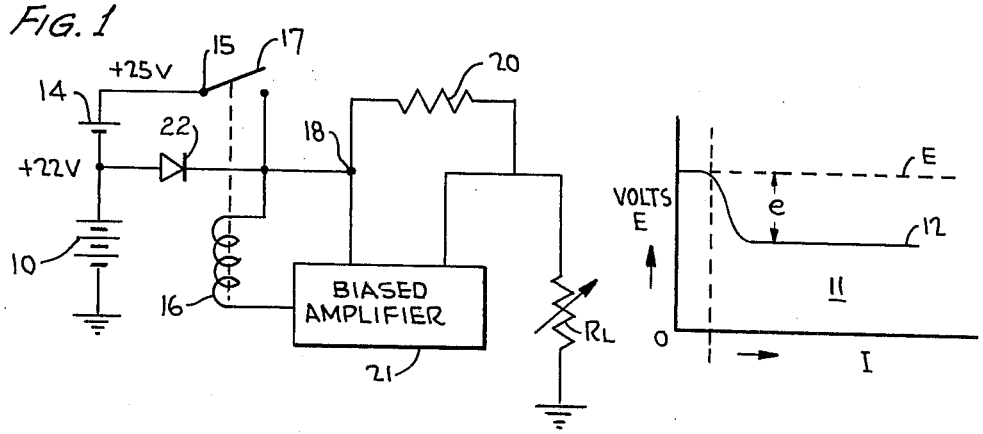
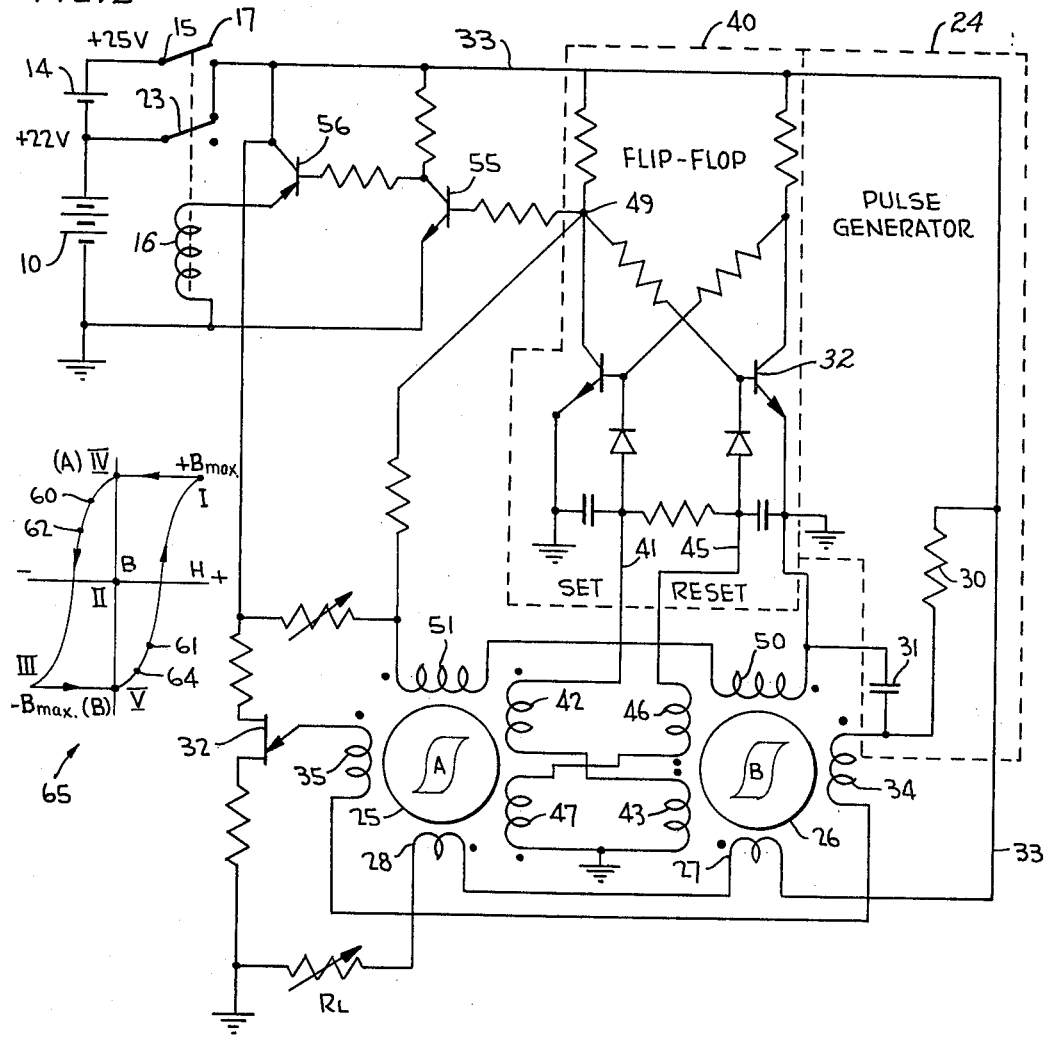

United States Patent Office 3,474,324
Patented Oct. 21, 1969

3,474,324
VOLTAGE REGULATOR ACTUATED BY PERIODIC PULSES
Martin G. Arnold, Plainview, N.Y., assignor to Leesona Corporation, Warwick, R.I., a corporation of Massachusetts
Filed Mar. 30, 1967, Ser. No. 627,214
Int. Cl. H02j 7/36; G05f 1/62
U.S. Cl. 323—15                          8 Claims

ABSTRACT OF THE DISCLOSURE

A direct current source regulation system is described which supplies current to a variable load from a primary source of current such as a battery and switches in a supplemental source of current for regulation purposes. Detector means coupled to sense the load current or voltage establishes a threshold level when a load change is significant enough to cause the current source voltage to drop. Switching means is responsive to the threshold level to couple the supplemental current source to the load, thereby maintaining a substantially constant voltage at the load. The detector means may operate a small part of time by means of a pulse source to thereby use little power even with high load currents and to make the sensing regulator power independent of change in load. Bistable state magnetic cores having a rectangular hysteresis characteristic are used in the control circuits of a described embodiment for sensing load currents or voltage and switching the supplemental current source into the load circuit.

FIELD OF INVENTION AND PRIOR ART

This invention is directed to voltage regulation systems and in particular it relates to regulation of loaded direct current sources such as batteries of electrochemical cells, as for example, those used in operating radio communication equipment.

In prior art systems some voltage regulators have employed shunt or series power consuming load stabilizing circuits utilizing power inversely responsive to variations of load current so that a substantially constant current or voltage results. These devices use considerable power from the source and are not generally compatible with battery regulation requirements where power dissipation must be low. Zener diodes have also been used to regulate voltages, but they are not adaptable over a large range of voltages or current densities. Furthermore, they also draw considerable power. Other regulation systems have employed switching controls which may be complex, unreliable, and expensive and in many cases cause sparking or impulses that prevent operation in the vicinity of sensitive electronic instruments or circuits. Most practicable prior art systems require complex and power consuming special circuit elements connected in the current flow paths to the load, and many are delicate and critical in operation.

OBJECTS AND BRIEF DESCRIPTION OF THE INVENTION

It is therefore a general object of the invention to provide improved regulation means and methods for direct current sources supplying variable loads.

It is a more specific object of the invention to provide regulation mens dissipating little power and operable over a significant range of loads.

Another object of the invention is to provide rugged long-life reliable regulation means that may be used with electronic circuits sensitive to impulses or radio frequency interference.

A still further object of the invention is to provide compact inexpensive regulation means with low power dissipation and compatible for use with batteries of electrochemical cells.

Yet another object of the invention is to provide a current source regulation system operable to establish a substantially constant voltage in the presence of a variation of load current between two extremes.

Therefore, in accordance with the invention, the load current or voltage is sensed to develop a threshold value which signifies a critical change of the primary battery voltage to switch and select cells of the battery or to cause a supplemental battery with appropriate characteristics to be connected to the load to stabilize the voltage. The load current is sensed in one preferred embodiment of the invention by means of a pair of cooperating magnetic cores exhibiting rectangular hysteresis characteristics. These cores have electromagnetic windings coupling for operation responsive to a periodic pulse source, thereby consuming little power, which is independent of the magnitude of the load current being regulated. In one typical battery configuration, a supplemental battery in series circuit with the primary battery is coupled to the load by a switching relay or other switching element at the same time the load is decoupled from the primary battery by means of a solid state rectifier.

SPECIFICATION

Other features and objectives of the invention will be found throughout the following specification which refers to the accompanying drawing, wherein:

FIGURE 1 is a simplified circuit diagram with an accompanying graph setting forth the principle of the invention; and FIGURE 2 is a schematic circuit diagram of a preferred voltage regulation system embodiment constructed in accordance with the invention with an accompanying hysteresis diagram.

Like reference characters are used to identify corresponding parts in the different figures.

In general, the primary current source 10 may be a battery of electrochemical cells, such as a battery of air depolarized cells, or fuel cells, supplying about twenty-two volts in no-load condition, and connected to operate a variable load RL which, for example, might be a transceiver radio device which draws high current in its transmitting condition and low current in its receiving condition. The graph 11 thus typifies the undesirable voltage fluctuation of a battery under such high-load current conditions by means of curve 12. If it is assumed that the high current load condition causes a drop of substantially three volts (shown as e in the graph) in the primary battery 10, then a supplemental battery 14 supplying three volts in no-load condition may be connected in series with the primary battery to provide higher voltage at terminal 15.

Relay 16, by way of switch contact 17, serves to connect the supplemental current source of battery 14 to the load at terminal 18 whenever a drop of voltage e is sensed as a result for example of switching from receive mode of operation at the load RL, where the load voltage would be E, to a transmit mode of operation where the load voltage received from only the primary battery 10 would drop to a value E–e.

Suitable means may be used for detecting either a change in load current or a change in voltage, such as for example a sensing resistor 20 of low ohmage coupled in the load current path to signify a voltage change to a biased amplifier 21. This amplifier is in essence a switch which operates relay 16 to close contacts 17 when a voltage sensed by resistor 20 overcomes a cut-off bias of the amplifier 21 at some predetermined threshold value dependent upon the operating parameters of the particular battery-load combination which is to be regulated.

In order to assure that there is no loss of power to the load RL at any instant as the supplemental battery 14 is switched in or out of circuit, unidirectional means such as a solid state rectifier 22 couples the primary source battery 10 continuously to the load RL. However, the supplemental source battery 14 is connected directly to the load RL by contact 17 only when the load current exceeds the predetermined threshold value. Because of the polarity of rectifier 22, the supplemental battery 14 will pass current only through the load RL when switch 17 is closed. Furthermore, the potential of battery 14 essentially cuts off conduction through rectifier 22 when switch 17 is closed. This gives a smooth transition between the two conditions without interruption of power. Similar isolation may alternatively be accomplished by other means such as the further relay contact 23 as shown in FIGURE 2.

While a single transition is shown between two different load conditions, the principles of the invention can be used to produce a series of different voltage steps by using more than one supplemental current source. Similarly with certain types of loads a similar effect may be accomplished by coupling batteries or other current sources in parallel rather than in series. This is particularly effective when constant current sources are employed.

The preferred embodiment of FIGURE 2 operates in the general manner hereinbefore described and serves to attain various advantageous improvements over prior art regulatory systems. One of the significant advantages is the use of a pulse generator section 24 to operate the system intermittently by instantaneously sensing the threshold level periodically, thereby reducing operating power considerably over a continuously operable arrangement. In this way the system is particularly compatible for battery or fuel cell operation when power drain must be kept low. The pulse generator itself is primarily a simple R-C discharge circuit utilizing resistor 30 and capacitor 31 to fire trigger semiconductor 32 after the capacitor has reached a sufficient voltage from current flowing from the current source lead 33 through resistor 30. The semiconductor 32, when fired, discharges capacitor 31 through windings 34, 35 and starts the pulse generation cycle over again on a periodic timing depending upon the R-C time constant.

Furthermore, the system utilizes a pair of magnetic cores 25, 26 exhibiting rectangular hysteresis characteristics to sense changes in load current efficiently by means of electromagnetic windings 27, 28 coupled to the respective cores in opposite sense, as noted by the dot notation at the respective ends of the windings. These windings 27, 28 may be merely a single wire passing through the centers of two toroidal cores represented schematically at 25, 26. However, the design of the system is flexible and the invention is not restricted to a particular connection of windings or relationship of turns. It is easily recognized by those skilled in the art that a magnetic control circuit can be constructed with different current capacities, winding relationships, etc., and that the details of such construction are not necessarily the same as the described embodiment.

Since the regulator system is periodically pulsed and since magnetic cores 25, 26 store signals statically in bistable state magnetic form, flip-flop 40 is utilized to retain the control information at a dynamic voltage level at terminal 49 thereby relaying signals sensed by cores 25, 26 at some predetermined threshold value for which the circuit is designed. Thus, the flip-flop 40 is set at lead 41 from a switching transition in one of the cores 25, 26 as provided through output windings 42, 43 on the respected cores. Similarly the flip-flop 40 is reset at lead 45 by means of windings 46, 47 on the respective cores 26, 25.

As may be seen by tracing the circuit of additional biasing windings 50, 51 on respective cores 26, 25, a "set point" current flows only when the flip-flop 40 is in its set state. The flip-flop output terminal 49 serves through transistor amplifiers 55, 56 to energize relay 16 and operate contacts 15, 17 in the manner hereinbefore described to effect voltage regulation at lead 33 and keep the voltage substantially constant for two significantly different levels of load current.

Because of the use of static magnetic switching cores 25, 26 and solid state circuit elements, the circuit is rugged, reliable and long in life, yet uses little control power even for large load currents. Furthermore, the power dissipated in the control circuits is known and need bear no relationship to the magnitude of load current. The power to the load RL is not significantly disturbed by the extremely small dissipation in instantaneous switching of magnetic cores 25, 26, which require no power in static storage conditions. Also the whole arrangement is inexpensive and very compact in size and is not subject to generation of large amplitude pulsing or sparking as in many regulatory systems.

The sensing and switching operation of magnetic cores 25, 26 is dependent upon the application of well-known general rules of operation as described, for example, in the publication "Interdigital Application of Magnetic Devices," Albert J. Meyerhoff, John Wiley & Sons, New York, 1960. In particular the windings and signal processing arrangement of this magnetic core configuration are described hereinafter with reference to the embodiment of FIGURE 2, reference being made primarily to histeresis diagram 65.

Cores A and B may be considered resident in opposite states such as respectively A in state IV and B in state V. When a unidirectional pulse of appropriate amplitude is applied to windings of appropriate polarity on the respective cores, the two cores are driven into saturation without any flux linkages between windings on the cores. Core A and core B are said to be saturated during the presence of this excitation and are positioned on their respective hysteresis curve at points III and I as shown in the diagram. The result is that there can be no induced voltage in the output windings on each core unless the core is caused to induce a change of B along the ordinate. Such changes are magnetically coupled through the cores only during a change of B. However, application of an appropriate direct current to the bias windings produces a flux level within the cores, which may be respectively at 60 for core A and 61 for core B. The net effect is to bias core A on the hysteresis curve to the left of point IV such as at point 60 and core B to the right of point V such as point 61. Now the periodic input pulses from generator 24 cause the flux to change from the bias point value 60 to $+B_{max}$ for core A and from bias point value 61 to $-B_{max}$ for core B. The two output windings (42, 47 and 46, 43 respectively) on each cores A and B now produce equal amplitude pulses but of opposite polarity 180 degrees out of phase. These windings are connected so that the output winding from core A if giving a positive pulse is in series with the output winding from core B giving a negative pulse. Since the pulse amplitudes are equal [due to the equal change in flux for both cores] and of opposite polarity, the net output from each series connection is zero. When load current is introduced into the cores, it acts to shift the bias point causing core A to produce more flux (62) and core B less flux (64) when pulsed. This is because the flux generated by the load current aids the bias flux in core A and subtracts from the bias flux in core B. The change in amplitude in the cores causes a greater voltage amplitude in the output windings of A and a smaller output from B. Therefore, one set of output windings such as 42, 43 will produce a positive output signal while the other set of windings such as 46, 47 will produce a negative output signal. These output signals may be used to trigger external circuits, and in this instance, serve to establish the state of flip-flop circuit 40 at leads 41, 45.

In operation of the present embodiment, therefore, load current is passed through windings 27, 28 at such level and polarity that relay 16 is operated by flip-flop 40 whenever sufficient load exists to pass from load condition E to point 12 on the curve of FIGURE 1 and vice versa.

It is claimed:

1. A direct current source regulation system comprising a combination, an electrically operable load, a primary source of current, a supplemental source of current, switching means selectively supplying current to said load from only said primary source in a first state and from both said primary sources and said supplemental source in a second state, detector means for determining a threshold level of current in said load, and means coupled for response to said detector means to place said switching means in said second state when the load current is above said threshold level wherein said detector means comprises an intermittent electronic current pulse generator and wherein said means coupled for response to said detector means intermittently senses the instantaneous level of the voltage at said load in response to pulses from said pulse generator.

2. A system as defined in claim 1, wherein said pulse generator comprises an R-C circuit chargeable from the current at said load to thereby establish an amplitude level detected in said detector means from which said threshold level is sensed.

3. A direct current source regulation system comprising in combination, an electrically operable load, a primary source of current, a supplemental source of current, switching means selectively supplying current to said load from only said primary source in a first state and from both said primary sources and said supplemental source in a second state, detector means for determining a threshold level of current in said load, and means coupled for response to said detector means to place said switching means in said second state when the load current is above said threshold level wherein said detector means comprises means supplying periodic electronic current pulses electromagnetically coupled with a bi-stable state magnetic core and circuit means coupled to the core to change its magnetic state in the presence of one of said periodic pulses when said load current is substantially at said threshold level.

4. A system as defined in claim 3 wherein said switching means comprises a flip-flop circuit which is connected to be set and reset by changes of magnetic state of said magnetic core circuit and a relay with a set of contacts operating in one state of said flip-flop circuit to connect said supplemental source to said load.

5. A system as defined in claim 3 wherein said magnetic core circuit comprises a pair of magnetic cores each having respective electromagnetic windings coupled thereto to receive both said periodic pulses and said load current.

6. A system as defined in claim 5, including a flip-flop circuit coupled to be set and reset each by separate windings coupled to both of said cores, and a further set of windings on both of said cores coupled to receiving a predetermined biasing current when said flip-flop circuit is in only one of its states.

7. A system as defined in claim 3 wherein said switching means comprises a flip-flop circuit coupled to be set and reset by opposite changes of magnetic state of said magnetic core circuit and winding means coupled to receive current in only one flip-flop state and coupled to said magnetic core to establish a bias therein.

8. The method of regulating a primary electrical direct current source supplying current to a variable load comprising the steps of (1) sensing a threshold level of the current supplied to said load at substantially a level producing a significant decrease in the source potential, and (2) coupling a series with said primary source at said threshold level a supplemental direct current source of such potential that the potential to said load is kept substantially constant with variations of said threshold level including the modified step of instantaneously sensing the threshold level periodically, and the additional steps of (1) remembering the threshold status between the instantaneous sensing periods, (2) retaining the supplemental source coupled to said load while the load current is above the threshold level, and (3) decoupling the supplemental source from said load when the load current falls below the threshold level.

References Cited
UNITED STATES PATENTS

| | | | |
|---|---|---|---|
| 2,816,262 | 12/1957 | Elliott | 323—15 |
| 3,343,073 | 9/1967 | Mesenhimer | 323—15 |
| 3,375,426 | 3/1968 | Dolamore | 323—15 X |
| 3,387,141 | 6/1968 | Howard | 307—49 |
| 3,387,194 | 6/1968 | Banks | 320—5 X |

A. D. PELLINEN, Primary Examiner

LEE T. HIX, Assistant Examiner

U.S. Cl. X.R.

307—49, 63, 77; 323—83